Jan. 17, 1961  J. H. BECKMAN  2,968,163
APPARATUS FOR STORING AND DISPENSING LIQUEFIED GASES
Filed May 19, 1958  2 Sheets-Sheet 1

INVENTOR.
JOHN H. BECKMAN
BY
William F Mesinger
ATTORNEY

Jan. 17, 1961 J. H. BECKMAN 2,968,163
APPARATUS FOR STORING AND DISPENSING LIQUEFIED GASES
Filed May 19, 1958 2 Sheets-Sheet 2

INVENTOR.
JOHN H. BECKMAN
BY
William F. Mesinger
ATTORNEY

United States Patent Office 2,968,163
Patented Jan. 17, 1961

2,968,163
APPARATUS FOR STORING AND DISPENSING LIQUEFIED GASES

John H. Beckman, Speedway, Ind., assignor to Union Carbide Corporation, a corporation of New York Filed May 19, 1958, Ser. No. 736,257

16 Claims. (Cl. 62—51)

This invention relates to an improved apparatus for storing liquefied gases and dispensing gas obtained from such liquid, and more particularly to apparatus for carrying liquid oxygen and supplying gaseous oxygen at suitable temperature and pressure to a distributing system or to occupants of an aircraft for breathing purposes.

An apparatus for storing a low-boiling liquefied gas, e.g. liquid oxygen, and providing therefrom a gas at desired pressures such as gaseous oxygen for passage to an oxygen supply system or to breathing apparatus as commonly used generally comprises a "cold converter." This term refers, in one form, to a double-walled, thermally insulated container for receiving and storing liquefied gas under pressure for a substantial period, with means for discharging, evaporating, and superheating the gas in such quantities as required. Also, aircraft cold converters generally include a pressure building circuit communicating between the lower and upper sections of the insulated container with means therein for evaporating and warming liquid from the lower section. The resulting warmed gas such as gaseous oxygen is then returned to the upper section of the container so as to build sufficient pressure in such container to provide the necessary pressure differential for circulation of the gas throughout the system.

Customary cold converters for industrial use generally are bulky and heavy. In contrast, aircraft cold converters have stringent weight and space requirements. A rule of thumb in the aircraft industry is that each pound of aircraft weight requires an additional nine pounds of engine, air frame, and fuel to carry it. Since airplanes presently cost about $40 per pound, each pound of weight saved represents an eventual saving of $400.

In an aircraft cold converter, the circuit has the functions of maintaining the desired gas pressure in the system and simultaneously providing an adequate supply of gas. One desirable feature of aircraft cold converters is to allow the withdrawal of gas, rather than liquid, when the gas pressure in the container becomes excessive. Otherwise the gas will be lost to the atmosphere through the relief valve. Earlier converters of the smaller sizes had no gas-saving or "economizer" circuits because of the complicated and heavy piping involved. As a result, up to 30% of the oxygen was wasted, apparently due primarily to the intermittent and pulsating gas demand. More recently the practical problems of the more complicated circuits have been solved to the extent that economizer circuits are used on recently constructed aircraft cold converters.

However, one limitation of the presently used aircraft cold converters is that the economizer circuit piping and valving is still relatively heavy and bulky, and involves severe maintenance problems. For example, in one commonly used aircraft converter, three pressure actuated flow-control valves are required in addition to relief and filling valves. The maintenance problems are particularly severe with this circuit because of the necessity for maintaining the proper relationship between the operating pressures of the control valves. Also, extra valves and piping entail additional weight and space which, as previously discussed, are critical in the case of aircraft cold converters.

Another important limitation of the heretofore proposed aircraft cold converters is that all of the pressure actuated valves in the circuit process gas as contrasted from liquid. For example, the evaporating coil of the pressure building circuit is usually positioned between the liquid phase withdrawal conduit and a pressure actuated valve, so that only gas phase fluid passes through the valve. This arrangement results in relatively high pressure drop through the valve due to frictional flow resistance, and such increased pressure drop can be critical in an aircraft converter especially shortly after take-off of the aircraft when the converter is relatively full. Movement of the aircraft causes "sloshing" of the liquefied gas which brings subcooled liquid to the vapor-liquid interface, thus cooling the vapor phase. This phenomenon tends to condense some of the vapor, resulting in reduced container pressure and lower gas delivering rates because of the smaller pressure driving force. A relatively high pressure drop in the pressure building-gas withdrawal circuit, as occasioned by the passage of gas through the pressure actuated valves, tends to magnify the problem because the resulting flow resistance prevents the container from rapidly regaining the lost pressure.

A principal object of the present invention is to provide an improved cold converter with a highly efficient yet lightweight gas economizer circuit.

Another object is to provide an improved cold converter with a highly efficient gas economizer circuit incorporating a relatively small number of valves requiring infrequent maintenance.

Still another object is to provide an improved cold converter wherein the fluid pressure drop through the pressure-actuated control valve is substantially reduced thereby increasing the speed and efficiency of pressure building.

These and other objects and advantages of the invention will become apparent from the following description and the accompanying drawings in which.

In the drawings similar items of apparatus in the several figures are designated by similar reference characters.

Figure 1:
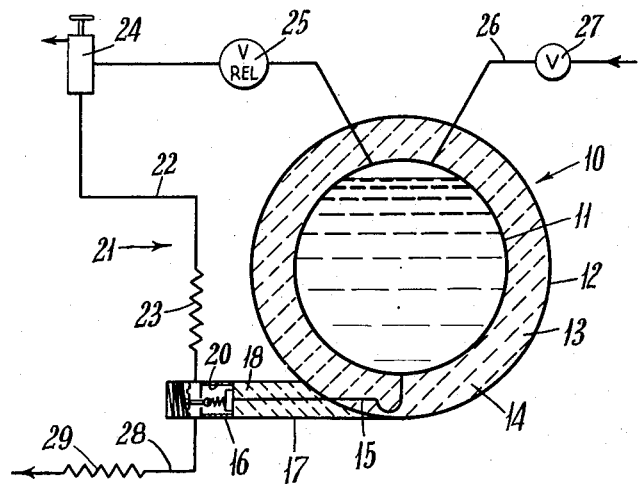
Fig. 1 shows a schematic flow-diagram of a cold converter for storing liquefied gas and dispensing gas obtained from such liquid, according to the present invention.

According to the present invention, a cold converter is provided for storing liquefied gas having a boiling point below —40° F., and dispensing gas obtained from such liquid. The invention is particularly advantageous in providing a lightweight aircraft cold converter for processing liquefied gases boiling below —297° F., such as liquid oxygen. The cold converter includes a double-walled heat insulated container for holding a body of the liquefied gas, and having lower and upper sections. Fluid conduit means communicate with the lower section for liquefied gas withdrawal from the container, and a pressure closing valve is provided in the conduit means for controlling such liquid withdrawal. The term "pressure closing valve" as used herein refers to a valve which is open at lower pressures, set to close at a predetermined pressure above such lower pressures, and remains closed at higher pressures. Thermal insulating means are provided for the fluid conduit so as to minimize heat inleak thereto, and a pressure building-gas withdrawal circuit is also provided which includes vaporizing and warmup means communicating with the valve, and a fluid conduit communicating between the vaporizing means and the upper section of the container. In a preferred embodiment, the inner walls of the pressure closing valve are lined with a thermal insulating material so as to reduce the heat inleak to such valve. The vaporizing and warmup means may, for example, be atmospherically heated. A coiled conduit is preferred for relatively large converters or units having relatively high operating pressure, and a pot-type flash evaporator is particularly suitable for relatively small converters. In the latter case, the pot may be bonded to the lower portion of the liquid container outer wall so as to recover atmospheric heat from such wall.

The present invention also provides a method for delivering pressurized gas from the present cold converter in which the desired gas delivery pressure is maintained during periods of low liquid level and high delivery rates. This is accomplished by preferentially withdrawing gas from the container upper section as long as the container pressure is above the predetermined pressure setting of the pressure closing valve. When the pressure drops below this setting, liquid is withdrawn from the container lower section through the thermally insulated conduit. Thereafter, during withdrawal the pressure in the container is maintained at an approximately constant point below the valve setting by withdrawing liquid through such valve, and evaporating at least part of such liquid in the vaporizing and warmup means for return to the container upper section as a pressure-building fluid. When the container pressure tends to rise, gas flows in the opposite direction from the upper section through the pressure building-gas withdrawal circuit as delivery gas.

During gas delivery, withdrawal fluid enters the delivery conduit from either the gas phase conduit or the liquid phase conduit, depending upon which line has the greater pressure at the point of junction. The liquid line would be expected to have a higher pressure because of the liquid head in the container. However, in some prior art cold converters this pressure head has been sufficiently dissipated by pressure drop in the liquid line, or passage through an evaporator or a control valve, or a combination of these factors, so that the liquid conduit pressure drops below the gas conduit pressure. When this condition occurs, gas is preferentially withdrawn from the gas phase line and the container pressure will continuously drop until the converter becomes inoperable. It has been found that a most serious cause of pressure drop in the liquid conduit is evaporation by heat inleak from the atmosphere. A relatively small percent of evaporation can vastly increase the pressure drop, which is undesirable for reasons previously discussed.

The present invention overcomes this difficulty by placement of a pressure actuated closing valve in the liquid withdrawal conduit thereby minimizing pressure drop in the valve and increasing the efficiency of the pressure build-up circuit. An aircraft cold converter constructed according to the present invention provides extremely high pressure building rates as compared to prior art converters. The present invention provides full operating pressure within about 1½ minutes after filling as compared with about 8½ minutes for prior art aircraft converters. The aforementioned valve is preferably positioned below at least most of the liquefied gas body so as to most efficiently utilize the stored liquid pressure head.

Another important feature of this improved cold converter is that the quantity of heat entering the liquid withdrawal conduit prior to its juncture with the gas phase conduit is minimized. This is accomplished by insulating the liquid conduit, e.g. shielding the inner walls of such conduit with a liner of low thermal conductivity material which is compatible with the liquefied gas being processed, such as tetrafluoroethylene or monochlorotrifluoroethylene plastics. Internal insulation is particularly effective near the valve end of the liquid conduit where significant quantities of external heat may be conducted along the conduit and cause evaporation therein. This longitudinal conductivity is particularly significant when the conduit consists of dissimilar metal sections having different thermal conductivities. This condition can occur for example, when the liquid conduit consists of aluminum and stainless steel segments with the higher thermal conductivity aluminum segment connected to the valve. Alternatively or in combination with internal insulation, the liquid conduit may be surrounded with insulating material such as powderous silica. If desired, the insulating layer may be enclosed in an airtight casing and the intervening space evacuated so as to achieve a highly efficient powder-in-vacuum insulating system. Heat inleak to the pressure-closing valve in the liquid line is preferably minimized by shielding the inner walls of the valve with the aforedescribed plastic material. The net result of combining these features is an improved aircraft cold converter from which gas may be delivered at a relatively high rate such as about 150 liters per minute even during periods of low liquid level, the desired gas delivery pressure being maintained during such periods. Aircraft could converters with liquid capacities of 5 and 10 liters have been constructed according to the present invention, the former having an outside diameter of 9¾ inches and an overall height of 10⅜ inches, and the latter having an outside diameter of 12¼ inches and an overall height of 12⅝ inches. It is to be understood that these features of the present invention are not necessarily required in large, stationary cold converters used for example in steel mills, because the size of the equipment lessens the effects of heat leak, and because greater liquid head can be made available by mounting the entire converter well above the liquid line. Also, in such converters there are no limitations placed on line and valve size by space of weight considerations. However, incorporation of the improvements of the present invention in industrial-type cold converter systems may result in advantageous cost reduction.

Referring now more specifically to Fig. 1, the cold converter 10 includes inner vessel 11 holding a low boiling liquefied gas, e.g. liquid oxygen. This vessel 11 is completely surrounded and separated from the atmosphere by an outer shell 12, an intervening space 13 under a vacuum pressure separating the outer wall of the inner vessel 11 from the inner wall of the outer shell 12. Vacuum space 13 is preferably filled with insulating material 14 e.g. powderous silica. One end of liquid conduit 15 communicates with the lower section of inner vessel 11 through the container walls and space 13, and the opposite end of conduit 15 terminates in the discharge port of pressure closing valve 16. The length of liquid conduit 15 extending outside of vacuum space 13 is preferably enclosed in thermal insulating shield 17 containing insulating material 18, which for example may be of the same composition as the material used to insulate the inner vessel 11. The thermal insulating shield 17 is bonded to and sealed at one end by the outer wall of outer shell 12 and the liquid conduit insulating material 18 communicates with the inner vessel insulating material 14 through a hole in the outer shell 12 so as to provide a continuous powder-in-vacuum insulating system. This eliminates the additional heat inleak to the fluid conduit from the sealing joint.

The pressure closing valve 16 may be any type which is suitable for low-temperature service, although the diaphragm-type is preferred. The pressure actuated and/or sealing means of most valves are adversely affected by accumulations of frost and ice. For example, bellows-actuated valves may become inoperative due to accumulation of frost and ice between convolutions of the bellows, and valves with packing or pistons may stick for the same reason. A diaphragm valve, on the other hand, offers a relatively smooth unbroken surface and is substantially unaffected by the aforedescribed accumulations. Valve 16 constitutes the means for controlling liquid and/or gas phase withdrawal from the inner vessel 11 and may, for example, be set to close at 70 p.s.i.g. The inner walls of pressure-closing valve 16 are preferably lined with a thermal insulating material for reasons previously described.

The pressure building-gas withdrawal circuit 21 communicates between pressure-closing valve 16 and the upper section of inner vessel 11, and includes gas conduit 22 containing pressure building conduit 23, such as a coil. Pressure build-up and vent valve 24 is also located in gas conduit 22, between valve 16 and the conduit end entering inner vessel 11. A pressure relief valve 25 is positioned in gas conduit 22 between pressure build-up and vent valve 24 and the latter mentioned conduit end.

Filling conduit 26 and valve 27 therein communicate with the upper section of inner vessel 11 by passage through the intervening walls and vacuum space 13. Also, a gas delivery conduit 28 having atmospherically heated evaporating-warmup coil 29 therein communicates with the body of pressure closing valve 16.

The improved cold converter circuit of Fig. 1 operates as follows: During liquefied gas filling through conduit 26 and filling valve 27 therein, the manually operated pressure build-up and vent valve 24 is positioned so as to allow free venting of evaporated liquefied gas from the upper section of inner vessel 11 through gas conduit 22 and valve 24 to the atmosphere. This valve also separates gas conduit 22 from the remainder of the pressure building-gas withdrawal circuit 21 and prevents flow of charging liquefied gas through pressure building coil 23 and pressure closing valve 16. When the cold converter is in normal operation and gas is being delivered therefrom, the pressure build-up and vent valve 24 is in a second adjusted position wherein the vent is closed and the end of gas conduit 22 communicating with the inner vessel 11 is connected to the remainder of the pressure building-gas withdrawal circuit 21. Pressure then builds up in gas conduit 22 due to the driving force of the liquid head in inner vessel 11, until the setting of pressure closing valve 16 is reached and the valve closes thereby terminating pressure build-up; that is, flow of liquid through liquid conduit 15, pressure closing valve 16, pressure building coil 23 where such liquid is evaporated and additionally pressurized due to atmospheric heat, and hence through valve 24 and gas conduit 22 into the upper section of inner vessel 11. Valve 16 may, for example, be set to close at 70 p.s.i.g., so that during delivery, gas is preferentially withdrawn from the upper section of inner vessel 11 and through the previously described circuit 21 and the body of valve 16 for final warmup in coil 29 of delivery conduit 28 and discharge therefrom for consumption or further processing as desired. It is to be noted that as long as the pressure in circuit 21 and the body of valve 16 remains above 70 p.s.i.g., this valve will remain closed and no liquid will be withdrawn through liquid conduit 15. If, during a period of no demand, the pressure in the cold converter continues to rise due to heat inleak, relief valve 25 communicating with the upper section of inner vessel 11 through gas conduit 22 opens and releases gas to the atmosphere until the excess pressure is relieved. This valve may for example be set to open at 90 p.s.i.g.

If the pressure in gas conduit 22 falls below the setting of valve 16, the latter opens and liquid is withdrawn from the lower section of inner vessel 11 through liquid conduit 15. This liquid passes through the body of valve 16 and hence to atmospherically heated evaporating and warmup coil 29 in delivery conduit 28. During delivery the gas pressure in the inner vessel 11 is held approximately constant by the metering effect of pressure closing valve 16; that is, when the pressure is relatively high the valve opening is reduced and gas is withdrawn from the inner vessel upper section through circuit 21. When the pressure is relatively low, valve 16 opens completely, thus allowing liquid to flow into the pressure building coil 23 for evaporation and passage to the inner vessel upper section to increase the gas pressure therein.

It will be apparent from the foregoing explanation that the cold converter of the present invention provides a highly efficient and lightweight combined pressure builder and gas economizer circuit requiring a relatively small amount of valving with very little accompanying maintenance. For example, only one pressure actuated valve in addition to the standard relief valve is required, whereas in the heretofore proposed aircraft cold converters using economizer circuits, at least three pressure actuated valves are required. As a result the circuit of the present invention requires only about 1 lb. of valves and associated piping as contrasted with 1¾ lbs. of valves and piping for prior aircraft cold converter circuits of comparable size.

Figure 2:
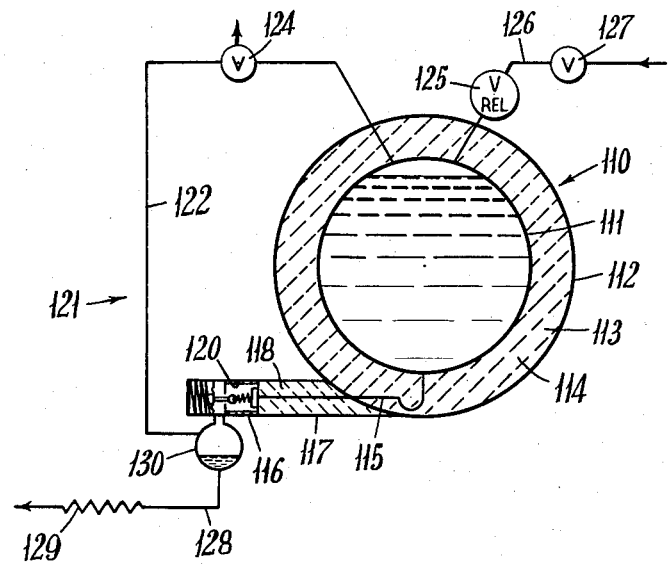
Fig. 2 shows a schematic flow diagram of a modified cold converter.

Fig. 2 illustrates a modified cold converter system according to the present invention, in which a flash evaporator pot instead of a coiled conduit is used as the atmospherically heated vaporizing means in the pressure building circuit as well as an evaporator for the supply circuit. Liquid withdrawn from the lower section of inner vessel 111 is passed through insulated liquid conduit 115 to pressure closing valve 116, the body of which communicates with flash evaporator pot 130. One end of gas conduit 122 of pressure building-gas withdrawal circuit 121 terminates in the upper section of evaporator pot 130, while one end of the gas delivery conduit 128 terminates in the lower section of such pot. One important advantage of a pot-type evaporator for aircraft cold converters is that such construction additionally minimizes pressure drop in the pressure building circuit. Lightweight tubular evaporators such as coil 23 of Fig. 1 have relatively higher flow resistance. Also, pot-type evaporators have a further advantage in eliminating pressure surging which can occur in the slender tubes of coil-type evaporators, due to the evaporating liquid. A further advantage of the pot-type evaporator is that the pressure build-up portion of the build-up and vent valve may be eliminated. This is because the pot-type evaporator can hold the relatively small quantity of liquid which would pass through the pressure closing valve 116 during the relatively short fill period, and this liquid is then evaporated in the pot and assists pressure building the converter during normal operation.

Figure 3:
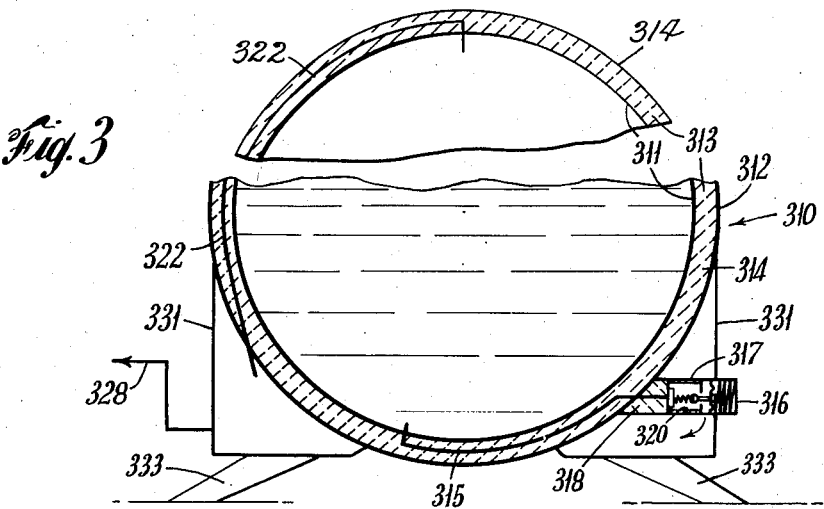
Fig. 3 is a view of a longitudinal cross-section through the lower half of a cold converter liquid container-flash evaporator pot assembly, according to the present invention.
Figure 3A:
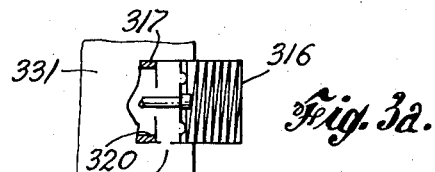
Fig. 3a is an enlarged view of a longitudinal cross-section through the pressure-closing valve body of Fig. 3.

Figs. 3 and 3a illustrates a preferred liquid container-flash evaporator pot assembly, in which the pot is fabricated as a ring-shaped pan 331 concentrically positioned around the lower section of the liquid container outer shell, and is bonded thereto. There are several advantages to this construction, as will be apparent from the drawings. For example, the pan 331 provides a manifold for the various conduit connections thereby simplifying the cold converter assembly. The gas conduit 322 joins the gas phase portion of pan evaporator 331. The discharge conduit 328 may contain an additional atmospherically heated evaporator if desired (not illustrated). However, in the cold converter embodiment of Fig. 3, the two gas streams entering delivery conduit 328 are sufficiently superheated so that additional heating means are usually not essential. Another advantage of the present construction is that insulated liquid conduit 315 and pressure-closing valve body 316 are contained within the pan 331, and thus further insulated from atmospheric heat inleak by the surrounding body of evaporating liquid.

Heat is transferred to the evaporating liquid in pan 331 in a highly efficient manner because such heat is not only obtained directly from the atmosphere by transfer through the pan walls, but also from the entire outer shell 312 of the liquid container. There is a direct heat transfer path from the shell 312 to the ring-shaped pan 331 because the latter is leak tightly bonded to the shell. To use this heat transfer advantage most effectively, the pan 331 and the liquid container outer shell 312 are preferably constructed from a material having high thermal conductivity, such as aluminum. Also, the pan provides a suitable surface on which to attach bottom leg supports 333, thus facilitating a compact assembly.

Figure 4:
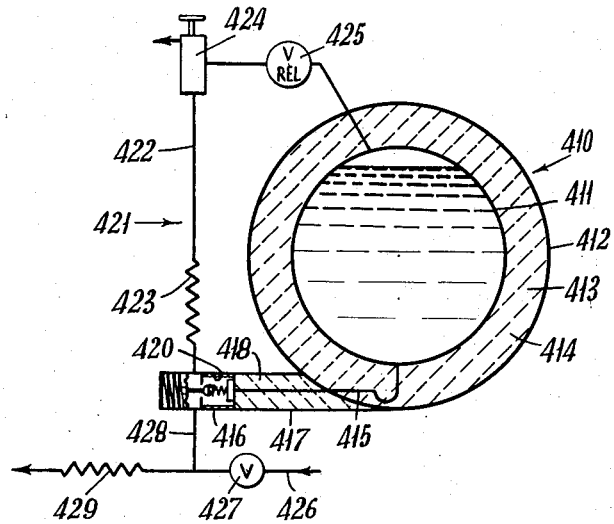
Fig. 4 shows a schematic flow diagram of another modified cold converter.

Fig. 4 illustrates another cold converter system according to the present invention which differs in certain particulars from Fig. 1, in that the liquid filling conduit 426 communicates with delivery conduit 428, and the charged liquid passes through the body of pressure closing valve 416 to insulated liquid conduit 415, and hence into the lower section of inner vessel 411. Thus, the cold converter of Fig. 4 is bottom-filled instead of top-filled, and liquid line 415 serves both as a liquid charging and liquid withdrawal conduit.

It is contemplated that apparatus according to this invention may also be employed to hold a supply of liquefied gas other than oxygen such as hydrogen, nitrogen, argon or neon and provide such gases under pressure for uses other than breathing atmospheres such as for pressurizing fluid fuels or for the operation of control systems.

Although preferred embodiments of the invention have been described in detail, it is contemplated that modifications of the apparatus may be made and that some features may be employed without others, all within the spirit and scope of the invention.

What is claimed is:

1. A cold converter for storing liquefied gas having a boiling point below −40° F., and dispensing gas obtained from such liquid comprising in combination a double-walled heat insulated container for holding a body of said liquefied gas and having lower and upper sections; fluid conduit means communicating with said lower section for liquefied gas withdrawal from such container; thermal insulation means associated with said fluid conduit means so as to minimize heat inleak to the fluid therein; a pressure building-gas withdrawal circuit including vaporizing and warmup means and a fluid conduit communicating between such vaporizing means and said upper section of said container; a gas delivery circuit having vaporizing means therein and communicating with said pressure building-gas withdrawal circuit; and a pressure closing, flow regulating valve in said fluid conduit means communicating with the container lower section, said valve also communicating with said pressure building-gas withdrawal circuit and said gas delivery circuit, and being arranged and constructed to regulatively open when the pressure in said pressure building-gas withdrawal circuit falls below a predetermined value so to adjustably control the total quantity of liquid withdrawn from said container lower section through said fluid conduit means, said valve also being adapted to preferentially allow gas withdrawal from the container upper section and through said pressure building-gas withdrawal circuit to said gas delivery circuit when the container pressure is relatively high, and allow liquid withdrawal from the container lower section to increase in quantity as the container pressure decreases, at least part of such withdrawn liquid flowing through said valve and said pressure building-gas withdrawal circuit to the container upper section to increase the container pressure.

2. A cold converter according to claim 1 for storing liquefied gas and dispensing gas obtained from such liquid, in which the inner walls of said pressure closing, flow regulating valve are lined with a thermal insulating material.

3. A cold converter according to claim 1 for storing liquefied gas and dispensing gas obtained from such liquid, in which said vaporizing and warmup means is an atmospherically heated conduit.

4. A cold converter according to claim 1 for storing liquefied gas and dispensing gas obtained from such liquid, in which said vaporizing and warmup means comprises a pot-type flash evaporator.

5. A cold converter according to claim 1 for storing liquefied gas and dispensing gas obtained from such liquid, in which a flash evaporator pot comprises said vaporizing and warmup means, and said delivery conduit communicates with the lower section of such flash evaporator.

6. A cold converter according to claim 1 for storing liquefied gas and dispensing gas obtained from such liquid, in which a flash evaporator pot bonded to the lower portion of the outer wall of said double-walled heat insulated container comprises said vaporizing and warmup means.

7. A cold converter according to claim 1 for storing liquefied gas and dispensing gas obtained from such liquid, in which a flash evaporator pot bonded to and sealed by the lower portion of the outer wall of said double-walled heat insulated container comprises said vaporizing and warmup means.

8. A cold converter according to claim 1 for storing liquefied gas and dispensing gas obtained from such liquid, in which a ring-shaped flash evaporator pot concentrically positioned around and bonded to the lower portion of the outer wall of said double-walled heat insulated container comprises said vaporizing and warmup means.

9. A cold converter according to claim 8 for storing liquefied gas and dispensing gas obtained from such liquid, in which support means for the double-walled liquid container are attached to said ring-shaped flash evaporator pot.

10. A cold converter according to claim 1 for storing liquefied gas and dispensing gas obtained from such liquid, in which a ring-shaped flash evaporator pot concentrically positioned around, bonded to and sealed by the lower portion of the outer wall of said double-walled heat insulated container comprises said vaporizing and warmup means, and the thermally insulated fluid conduit means and pressure closing valve body are contained within such evaporator pot.

11. A cold converter according to claim 1 for storing liquefied gas and dispensing gas obtained from such liquid, in which said pressure closing, flow regulating valve is of the diaphragm-type.

12. A cold converter according to claim 1 for storing liquefied gas and dispensing gas obtained from such liquid, in which said pressure closing, flow regulating valve is positioned below at least most of the liquefied gas body.

13. A portable cold converter for storing liquid oxygen and dispensing gaseous oxygen obtained from such liquid, comprising in combination a double-walled heat insulated container for holding a body of said liquid oxygen and having lower and upper sections; fluid conduit means communicating with said lower section for liquid oxygen withdrawal from such container; an insulating liner contiguous with such fluid conduit so as to minimize heat inleak thereto; a pressure building-gas withdrawal circuit including a ring-shaped flash evaporator pot enclosing the thermally insulated fluid conduit, the pot being concentrically positioned around and bonded to the lower portion of the container outer wall, and a fluid conduit communicating between such evaporator pot and said upper section of the container; and a delivery conduit communicating with the lower section of such flash evaporator; and a pressure closing, flow regulating diaphragm-type valve in said fluid conduit means communicating with the container lower section, the inner walls of such valve being lined with thermal insulating material, the valve body being enclosed in said flash evaporator pot for discharge of liquid therefrom into such pot, such valve being arranged and constructed to regulatively open when the pressure in said pressure building-gas withdrawal circuit falls to a predetermined value so as to adjustably control the total quantity of liquid withdrawn from said container lower section through said fluid conduit means, said valve also being adapted to preferentially allow gas withdrawal from the container upper section and through said pressure building-gas withdrawal circuit to said gas delivery circuit when the container pressure is relatively high, and allow liquid withdrawal from the container lower section to increase in quantity as the container pressure decreases, at least part of such withdrawn liquid flowing through said valve and said pressure building-gas withdrawal circuit to the container upper section to increase the container pressure.

14. A portable cold converter for storing liquid oxygen and dispensing gaseous oxygen obtained from such liquid, comprising in combination a double-walled heat insulated container for holding a body of said liquid oxygen and having lower and upper sections; fluid conduit means communicating with said lower section for liquid oxygen withdrawal from such container; an insulating liner contiguous with such fluid conduit so as to minimize heat inleak thereto; a pressure building-gas withdrawal circuit including vaporizing and warmup means, and a fluid conduit communicating between such vaporizing means and said upper section of said container; a gas delivery conduit having vaporizing means therein and communicating with said pressure building-gas withdrawal circuit; and a pressure closing, flow regulating diaphragm-type valve in said fluid conduit means communicating with the container lower section, the inner walls of such valve being lined with thermal insulating material, said valve also communicating with said pressure building-gas withdrawal circuit and said gas delivery circuit, and being arranged and constructed to regulatively open when the pressure in said pressure building-gas withdrawal circuit falls below a predetermined value so as to adjustably control the total quantity of liquid withdrawn from said container lower section through said fluid conduit means, said valve also being adapted to preferentially allow gas withdrawal from the container upper section and through said pressure building-gas withdrawal circuit to said gas delivery circuit when the container pressure is relatively high, and allow liquid withdrawal from the container lower section to increase in quantity as the container pressure decreases, at least part of such withdrawn liquid flowing through said valve and said pressure building-gas withdrawal circuit to the container upper section to increase the container pressure.

15. A portable cold converter for storing liquid oxygen and dispensing gaseous oxygen obtained from such liquid, comprising in combination a double-walled heat insulated container for holding a body of said liquid oxygen and having lower and upper sections; fluid conduit means communicating with said lower section for liquid oxygen withdrawal from such container; thermal insulation means associated with such fluid conduit so as to minimize heat inleak thereto; a pressure building-gas withdrawal circuit including vaporizing and warmup means and a fluid conduit communicating between such vaporizing means and said upper section of said container; a gas delivery conduit having vaporizing means therein and communicating with said pressure building-gas withdrawal circuit; and a pressure closing, flow regulating diaphragm-type valve in said fluid conduit means communicating with the container lower section, the inner walls of such valve being lined with thermal insulating material, said valve also communicating with said pressure building-gas withdrawal circuit and said gas delivery circuit, and being arranged and constructed to regulatively open when the pressure in said pressure building-gas withdrawal circuit falls below a predetermined value so as to adjustably control the total quantity of liquid withdrawn from said container lower section through said fluid conduit means, said valve also being adapted to preferentially allow gas withdrawal from the container upper section and through said pressure building-gas withdrawal circuit to said gas delivery circuit when the container pressure is relatively high, and allow liquid withdrawal from the container lower section to increase in quantity as the container pressure decreases, at least part of such withdrawn liquid flowing through said valve and said pressure building-gas withdrawal circuit to the container upper section to increase the container pressure.

16. A portable cold converter for storing liquid oxygen and dispensing gaseous oxygen obtained from such liquid, comprising in combination a double-walled heat insulated container for holding a body of said liquid oxygen and having lower and upper sections; fluid conduit means communicating with said lower section for liquid oxygen withdrawal from such container; an insulating liner contiguous with such fluid conduit so as to minimize heat inleak thereto; a pressure building-gas withdrawal circuit including vaporizing and warmup means and a fluid conduit communicating between such vaporizing means and said upper section of said container; a gas delivery conduit having vaporizing means therein and communicating with said pressure building-gas withdrawal circuit; and a pressure closing, flow regulating valve in said fluid conduit means communicating with the container lower section and having inner walls lined with thermal insulating material, said valve also communicating with said pressure building-gas withdrawal circuit and said gas delivery circuit, and being arranged and constructed to regulatively open when the pressure in said pressure building-gas withdrawal circuit falls below a predetermined value so to adjustably control the total quantity of liquid withdrawn from said container lower section through said fluid conduit means, said valve also being adapted to preferentially allow gas withdrawal from the container upper section and through said pressure building-gas withdrawal circuit to said gas delivery circuit when the container pressure is relatively high, and allow liquid withdrawal from the container lower section to increase in quantity as the container pressure decreases, at least part of such withdrawn liquid flowing through said valve and said pressure building-gas withdrawal circuit to the container upper section to increase the container pressure.

References Cited in the file of this patent

UNITED STATES PATENTS

| Number | Name | Date |
|---|---|---|
| 1,505,095 | Heylandt | Aug. 19, 1924 |
| 2,316,495 | White | Apr. 13, 1943 |
| 2,328,647 | Jackson | Sept. 7, 1943 |
| 2,493,708 | White | Jan. 3, 1950 |
| 2,497,793 | Ransome | Feb. 14, 1950 |
| 2,576,985 | Wildhack | Dec. 4, 1951 |
| 2,747,374 | Thompson | May 29, 1956 |